United States Patent [19]

Caputo et al.

[11] Patent Number: 4,656,572
[45] Date of Patent: Apr. 7, 1987

[54] PWM INVERTER

[75] Inventors: William R. Caputo, Wyckoff; Alan L. Husson, Hackettstown, both of N.J.; Kenneth K. Lee, Alexandria, Va.

[73] Assignee: Westinghouse Electric Corp., Pittsburgh, Pa.

[21] Appl. No.: 896,568

[22] Filed: Aug. 14, 1986

Related U.S. Application Data

[63] Continuation of Ser. No. 702,997, Feb. 19, 1985, abandoned.

[51] Int. Cl.[4] .............................................. H02M 1/12
[52] U.S. Cl. ........................................ 363/41; 363/98; 318/802; 318/811
[58] Field of Search .................. 363/41, 43, 98, 132; 318/799, 800, 801, 802, 811

[56] References Cited

U.S. PATENT DOCUMENTS

| | | | |
|---|---|---|---|
| 4,245,290 | 1/1981 | Lipman | 363/41 |
| 4,290,108 | 9/1981 | Woehrle et al. | 363/41 X |
| 4,321,663 | 3/1982 | Krtek | 363/41 X |
| 4,352,154 | 9/1982 | Reiber | 363/123 |
| 4,387,421 | 6/1983 | Zach et al. | 364/148 |
| 4,418,308 | 11/1983 | Bose | 318/803 |
| 4,480,299 | 10/1984 | Muto et al. | 318/802 X |
| 4,481,457 | 11/1984 | Zach et al. | 318/811 X |

FOREIGN PATENT DOCUMENTS 0035150 2/1981 European Pat. Off.
1601011 10/1981 United Kingdom.

OTHER PUBLICATIONS

"Microprocessor Based Sinusoidal PWM Inverter by DMA Transfer", K. S. Rajashekara & Joseph Vithayayathil, IEEE Transaction on Industrial Electronics, vol. IE-29, No. 1, Feb. '82.
"A High Performance Pulse-Width Modulator for an Inverter-Fed Drive System Using a Microcomputer", B. K. Bose & H. A. Sutherland, CH1817-6/82/00-00-9847, IEEE.
"Microprocessor Control of a Three-Phase Inverter in Induction Motor Speed Control System", Vithal V. Athani & Sudhir M. Deshpande, 0018-9421/80/11-00-0291, IEEE.
"A Comparison of PWM Strategies for Inverter-Fed Induction Motors", John M. D. Murphy & Michael Egan, 0093-9994/83/0500-0363, IEEE.
"A Microprocessor-Controlled Pulse Width Modulated Inverter", Hoang Le-Huy, IECI '78 Proceedings-Industrial Applications of Microprocessors, Mar. 20-22, 1978.
"Microprocessor-Based PWM System for Inverter Fed Squirrel-Cage Motor Traction Drives", A. Moschetti Brown, Boverie & Cie., Manheim, Germany.
"A Microcomputer-Based Control Signal Generator for a Three-Phase Switching Power Inverter", M. Varovitsky, CH1817-6/82/0000-0836, IEEE.
"A Digital Logic PWM Speed Control for Single and Polyphase AC Motors", Thomas Mazur, PS-MO-N-PMI.

Primary Examiner—Peter S. Wong
Attorney, Agent, or Firm—D. R. Lackey

[57] ABSTRACT

A PWM inverter in which the maximum three-phase RMS pole-to-pole output voltage is increased, to more efficiently utilize a fixed DC power supply, by generating substantially sinusoidal changing pole voltages having no values within predetermined zones adjacent to each power supply limit, and by switching each pole voltage to a power supply limit for a predetermined number of electrical degrees during each half cycle, resulting in step changes in the pole voltage waveforms from the substantially sinusoidal changing waveform to a fixed power supply limit.

17 Claims, 23 Drawing Figures

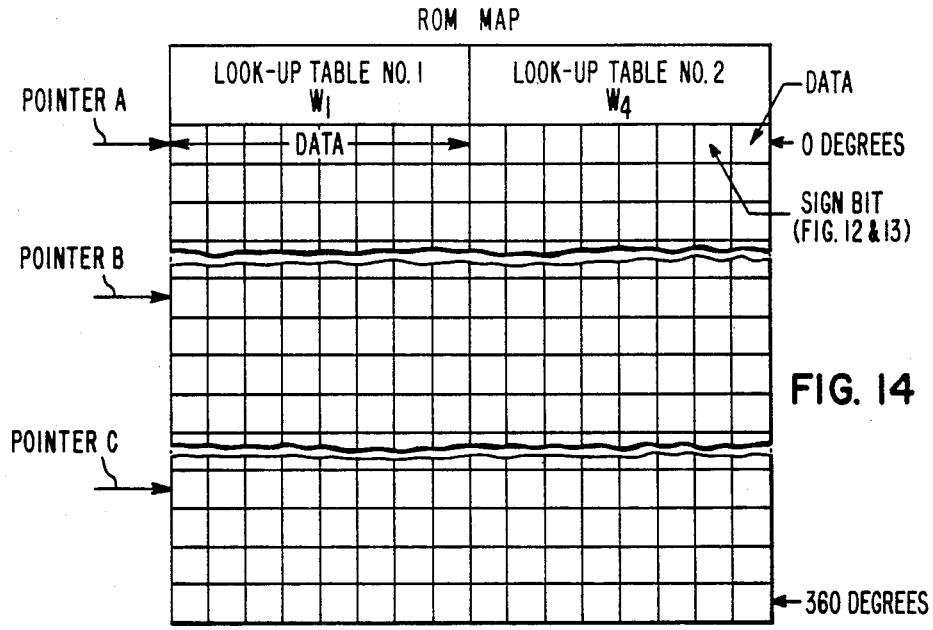
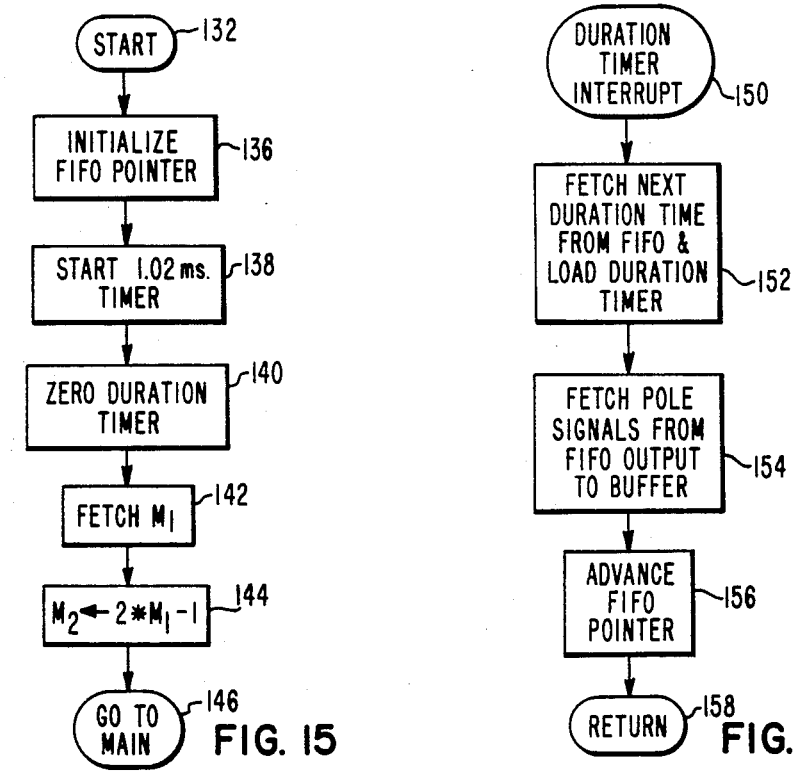
FIG. 14
FIG. 15
FIG. 16

FIG. 19

RAM MAP — FIFO STACK

| DURATION TIME | POLES 1 | 2 | 3 |
|---|---|---|---|
| 200 μs | 0 | 0 | 0 |
| 100 μs | 0 | 0 | 1 |
| 100 μs | 0 | 1 | 1 |
| 200 μs | 1 | 1 | 1 |
| 100 μs | 0 | 1 | 1 |
| 100 μs | 0 | 0 | 1 |
| 220 μs | 0 | 0 | 0 |

(134 →) FOR CURRENT CARRIER PERIOD

FOR NEXT CARRIER PERIOD

FIG. 21

RAM MAP — FIFO STACK

| DURATION TIME | POLES 1 | 2 | 3 |
|---|---|---|---|
| 200 μs | 1 | 1 | 1 |
| 200 μs | 0 | 1 | 1 |
| 200 μs | 0 | 0 | 1 |
| 420 μs | 0 | 0 | 0 |

(134 →) FOR CURRENT CARRIER PERIOD

FOR NEXT CARRIER PERIOD

FIG. 22

RAM MAP — 1.02 ms. TIMER — DURATION TIMER $M_2$
$R$
$F$
$W_5$

4,656,572

PWM INVERTER

This application is a continuation of application Ser. No. 702,997 filed Feb. 19, 1985, now abandoned.

BACKGROUND OF THE INVENTION

1. Field of the Invention

The invention relates in general to inverters, and more specifically to pulse width modulated (PWM) inverters operable from a fixed voltage DC power supply.

2. Description of the Prior Art

In certain applications it is desirable to operate a three-phase load without harmonics of the fundamental, such as an AC induction motor, from a DC source having a fixed output voltage, such as a bank of batteries. Since batteries are costly, it is desirable to obtain the highest RMS line-to-line voltage possible from the available DC voltage. Stated conversely, for a given RMS three-phase inverter output voltage, it is desirable to minimize the number of batteries required to produce it.

SUMMARY OF THE INVENTION

Briefly, the present invention relates to PWM inverters, and methods of operating such inverters, wherein the power source has a fixed voltage. The maximum three-phase RMS output voltage from the inverter is obtained by switching each pole voltage from a varying value to a predetermined fixed power supply limit for a predetermined portion of each half cycle of each pole voltage. During a predetermined number of electrical degrees of the positive going alternation or half cycle of a pole voltage, it is switched to the fixed upper limit, i.e., to the positive output terminal of the DC source. During a predetermined number of electrical degrees of the negative going alternation, or half cycle, each pole voltage is switched to the fixed lower limit, ie., to the negative output terminal of the DC source. Further, while one pole voltage is fixed, a predetermined associated pole voltage required to produce a predetermined pole-to-pole voltage, is modified, as required, such that the resultant pole-to-pole voltage is sinusoidal.

In a preferred embodiment of the invention, a microcomputer-based modulator is utilized, with the waveform of one pole voltage being stored in a read-only memory (ROM). The waveform is stored in first and second look-up tables, the outputs of which are combined. The varying portions of the pole voltage waveform are stored in a first look-up table, and the fixed portions are stored in a second look-up table. The second look-up table can express the upper and lower fixed limits with a single bit, such as a "one" for the upper limit, and a "zero" for the lower limit.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 14 illustrates how the two look-up tables referred in FIGS. 10-13 may be stored in a wraparound look-up table;

FIG. 15 is a flow chart of an initialization program for the computer shown in FIG. 8;

FIG. 16 is a flow chart of an interrupt driven program which controls the switching of the power poles;

FIG. 19 is a RAM map illustrating a FIFO stack containing the time values for a duration timer and the signals for the power poles for each duration interval, for the example shown in FIG. 18;

FIG. 21 is a RAM map illustrating a FIFO stack containing the time values and the signals for the power poles during each duration interval, for the example shown in FIG. 20; and FIG. 22 is a RAM map setting forth timers and other variables for the programs shown in FIGS. 15, 16 and 17.

DESCRIPTION OF PREFERRED EMBODIMENTS

Figure 1:
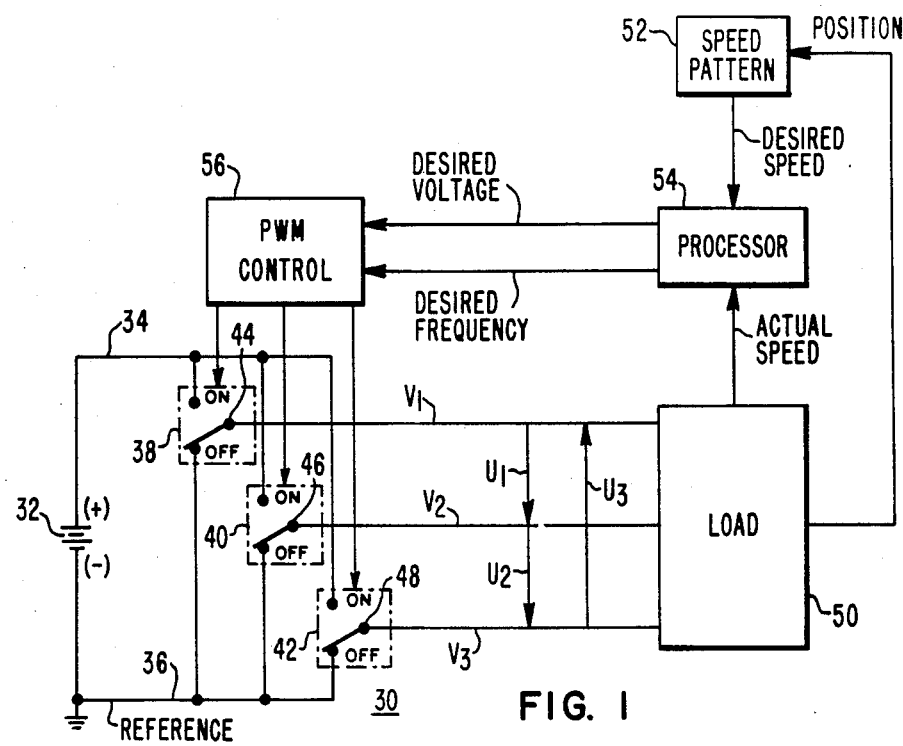
FIG. 1 is a simplified schematic diagram of an inverter power section used to feed a three-phase load, such as an induction motor, from a fixed voltage DC source, such as a bank of batteries.

Referring now to the drawings, and to FIG. 1 in particular, there is shown a simplified schematic diagram of a three-phase pulse width modulated (PWM) inverter 30 operating from a fixed DC source 32, such as a bank of batteries. Inverter 30, which is in the form of a three-phase bridge, includes DC buses 34 and 36 connected to DC source 32. Bus 34 is connected to the upper fixed limit, or positive terminal, of power supply 32, and bus 36 is connected to the lower fixed limit, or negative terminal of power supply 32.

Figure 2:
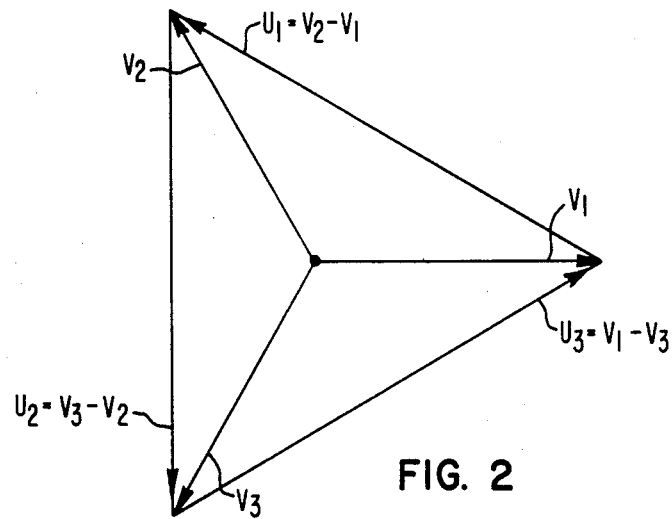
FIG. 2 is a phasor diagram illustrating the pole-to reference voltages, and the resulting pole-to-pole voltages of the inverter shown in FIG. 1.

First, second and third power poles 38, 40 and 42, respectively, which develop the three-phases of an AC voltage, are connected between buses 34 and 36. The power poles each function as a two-position switch, connecting an output terminal to either the positive or negative side of the DC source 32. Power poles 38, 40 and 42 have output terminals 44, 46 and 48, respectively, connected to a three-phase AC load 50, such as a three-phase AC induction motor driving an elevator car whose speed is to be controlled. An elevator car is given by way of example only, as the three-phase induction motor may be driving any load whose speed is to be controlled. A speed pattern generator 52 provides a signal indicative of the desired car speed in response to car position, and a processor 54 compares the desired speed with the actual car speed to develop an error signal. The processor 54, in response to the error signal, provides output signals indicative of the desired motor voltage and frequency at any instant, as required to minimize the speed error, and a PWM controller 56 turns the power poles on and off to obtain the necessary sinusoidal three-phase line-to-line voltages $U_1$, $U_2$ and $U_3$, ie., between the power poles, which have the instantaneous voltage magnitude and frequency necessary for the induction motor to drive the elevator car at the desired speed. FIG. 2 is a phasor diagram which illustrates the pole-to reference voltages $V_1$, $V_2$ and $V_3$, and the resulting pole-to-pole voltages $U_1$, $U_2$ and $U_3$.

Figure 3:
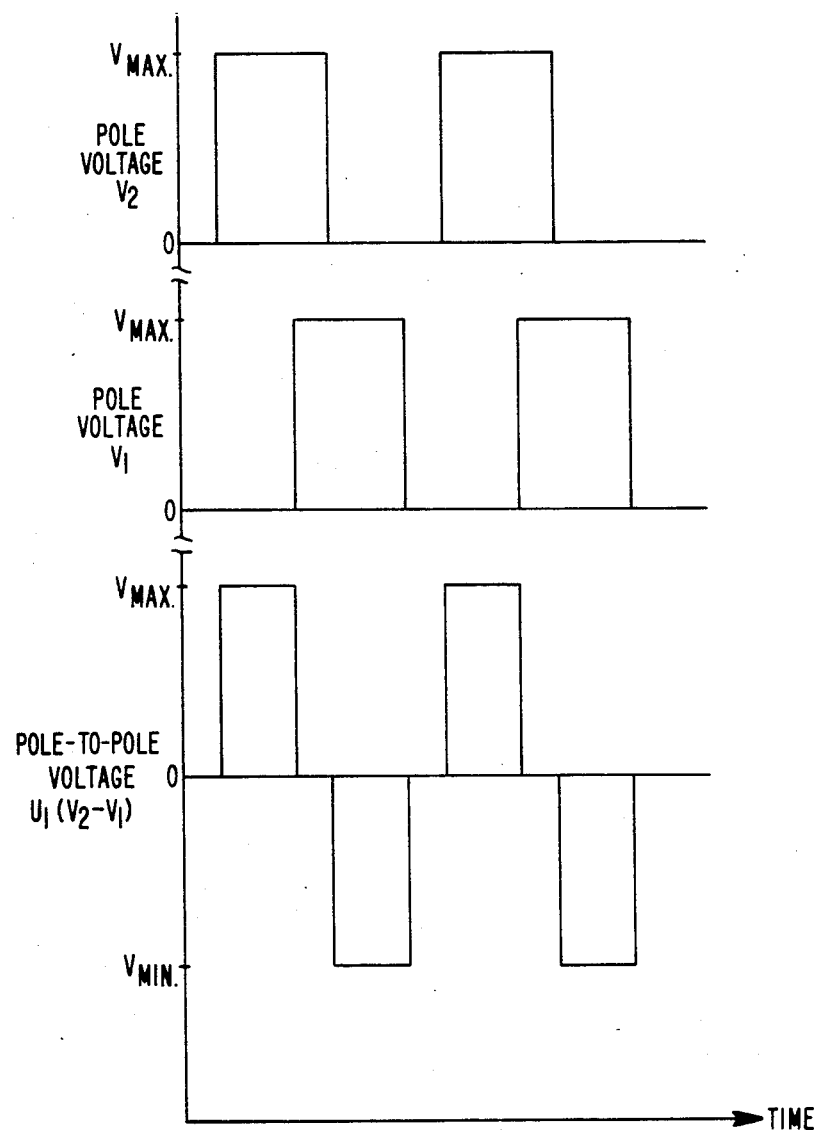
FIG. 3 is a diagram illustrating the waveforms of two pole voltages, and the resulting pole-to-pole voltages, for the six step modulation technique.

FIG. 3 illustrates the development of an AC line-to-line voltage $U_1$ from phase or pole voltages $V_1$ and $V_2$ using the six step modulation technique. While the peak-to-peak line-to-line voltage $U_1$ is twice the magnitude of the DC source, and the RMS of the fundamental line-to-line voltage is 78% of the DC source, which is a highly efficient utilization of the source, the waveforms are square. Thus, the waveforms are rich in undesirable harmonics which cause audible motor noise and torque pulsations, making the pulse width modulation technique preferable for an elevator application, where low noise and smooth ride are essential.

Figure 4:
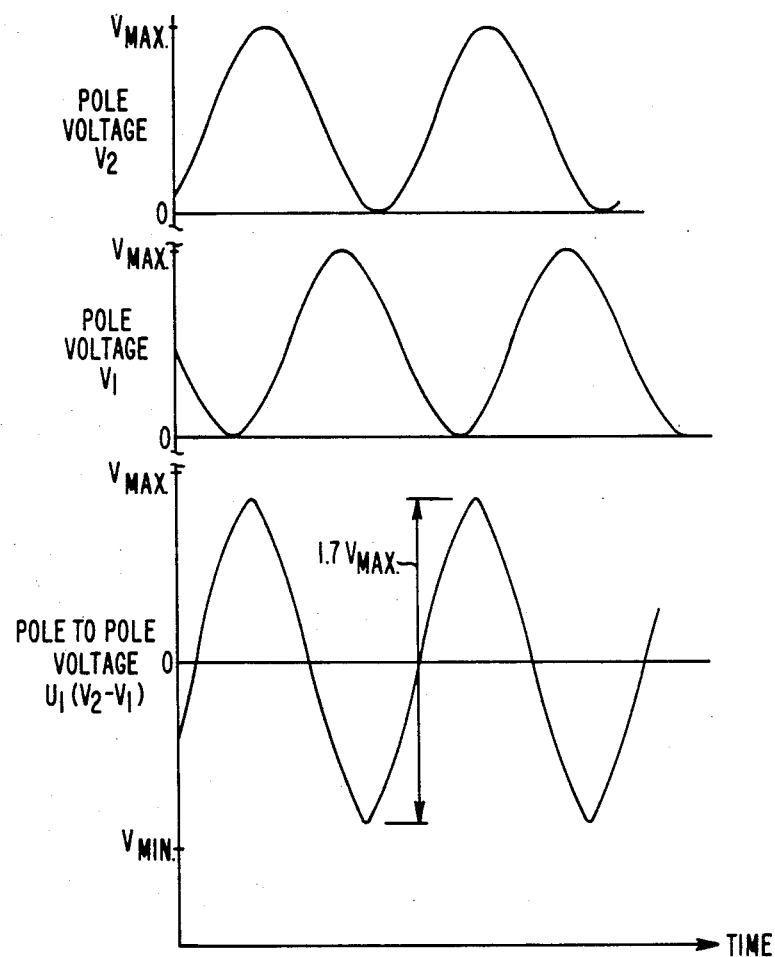
FIG. 4 is a diagram which illustrates ideal pole voltage and pole-to-pole waveforms generated by the PWM technique.

FIG. 4 illustrates the PWM inverter control scheme where the poles are switched on and off in a switching regulator mode. The average output of each pole varies sinusoidally, as does the line-to-line voltages. FIG. 4 illustrates the "ideal" waveforms generated by the PWM technique. With the ideal waveforms, i.e., the pole and pole-to-pole voltages are all sinusoidal, the peak-to-peak line voltage is equal to 1.7 times the DC source voltage $V_{max}$, and the RMS line-to-line voltage is now only 61.2% of the DC source voltage $V_{max}$. This requires that the DC source voltage be considerably higher than when using the six step modulation technique shown in FIG. 3, in order to generate a given RMS output voltage. Since higher voltage translates to more batteries in the DC power supply 32, it would be desirable to be able to reduce the number of batteries required for a given RMS output voltage, but this objective should only be achieved while maintaining the line-to-line voltage waveforms sinusoidal.

Figure 5:
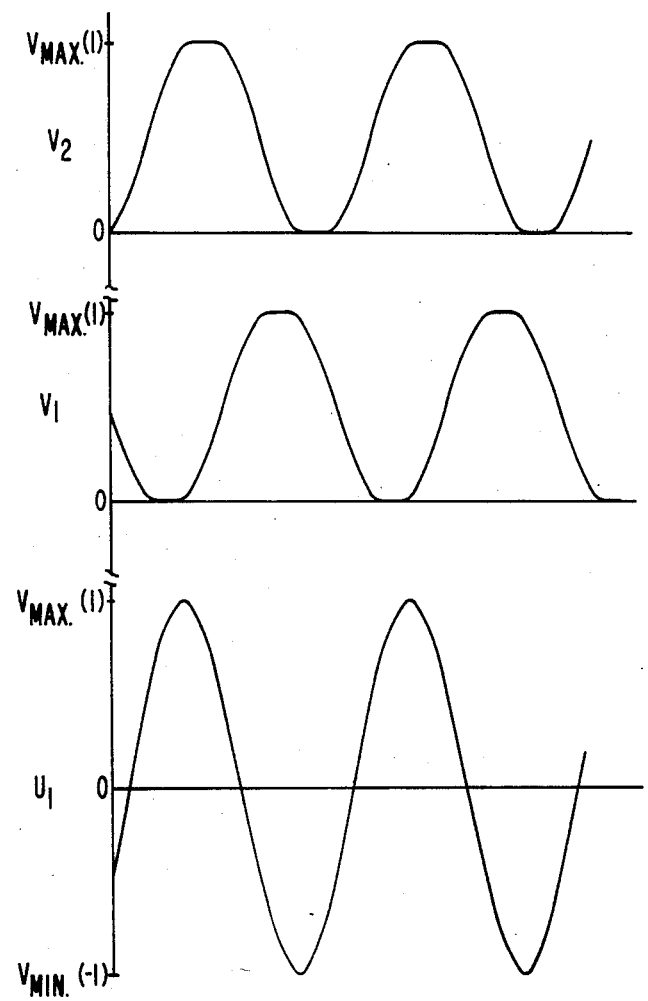
FIG. 5 is a diagram which illustrates pole voltages and pole-to-pole voltage waveforms which would generate the theoretical maximum sinusoidal output voltage from a given DC input voltage.

FIG. 5 illustrates how the RMS voltage can theoretically be increased for a given DC source magnitude by modulating the power poles such that the power pole waves are selected portions of sine waves with flat sections at both limits of the DC source, and the line-to-line sine wave $U_1$ peaks precisely at $V_{max}$ and $V_{min}$. The peak-to-peak line voltage $U_1$ is twice the DC source voltge $V_{max}$, and the RMS line-to-line voltage is increased to 70.7 percent of the DC source voltage $V_{max}$. This is the theoretical maximum sinusoidal voltage obtainable from the DC source.

The theoretical maximum of FIG. 5, however, cannot be achieved because of the "on" and "off" time limitations of the solid state switching devices, e.g., thyristors or transistors, used in the power poles. Each power switch must be "on" or "off" for a minimum period of time, typically 50 to 100 μs. This limits the duty cycle percentage of the PWM inverter.

In PWM, a carrier having a frequency much higher than the highest AC output frequency to be developed by the inverter, is used to divide the output sine wave into a plurality of sections or carrier periods. The desired sine wave magnitude during each of such carrier periods is translated to the percentage of each carrier period that the power pole should be turned on. The output frequency is determined by the number of such carrier periods used to construct one output sine wave. Thus, with the "on" and "off" time limitations of the power switches mentioned above, and using 100 μs as the minimum on and off times, and a carrier period of 1000 μs, as practical examples, the allowable duty cycles are 0%, 10% thru 90%, and 100%. Duty cycles between 0% and 10%, and between 90% and 100%, are forbidden zones which cannot be achieved. The "on" and "off" times of the power switching devices are used to determine the modulation fraction $M_1$. For the example just mentioned, the modulation fraction $M_1$ would be 0.9.

Figure 6:
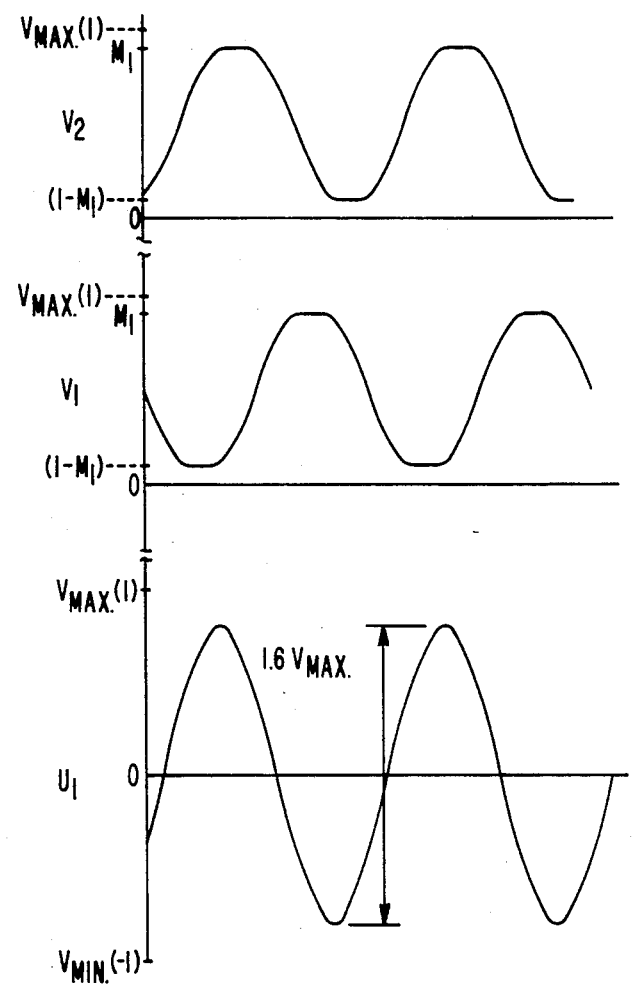
FIG. 6 is a diagram which illustrates the pole voltages and pole-to-pole voltage waveforms of FIG. 5, modified to include the "on" and "off" time limitations of the power switching devices used in the power poles.

FIG. 6 illustrates the pole voltages $V_1$ and $V_2$, and the resultant line-to-line voltage $U_1$, obtainable when the on and off time limitations of the power switching devices are applied. It will be noted that the pole voltages $V_1$ and $V_2$ have flat portions at the modulation fraction $M_1$, and they have flat portions at 1 minus $M_1$, where $V_{max}$ is equal to 1. In the example of FIG. 6, the peak-to-peak, line-to-line voltage $U_1$ is limited to 1.6 times the DC source voltage $V_{max}$, and the RMS line-to-line voltage is limited to 56.6% of the DC source voltage $V_{max}$.

The present invention recognizes that, while in the example previously set forth duty cycles between 0 and 10%, and between 90 and 100% cannot be achieved, that duty cycles of 0% and 100% are indeed achievable. Instead of regulating only between 10% and 90%, when the regulated, changing waveform reaches a duty cycle limit, it is switched such that it jumps in a step function to the adjacent fixed power supply limit. The waveform is then effectively clamped or held at the limit until the waveform again desires to return to the allowable range. When this occurs, the waveform is switched such that it steps sharply from the fixed power supply limit, back to a regulated, changing portion of the waveform. Such pole-to-pole reference waveforms $V_1$, $V_2$ and $V_3$, and the resulting sinusoidal line-to-line waveforms $U_1$, $U_2$ and $U_3$, are set forth in FIG. 7.

Figure 7:
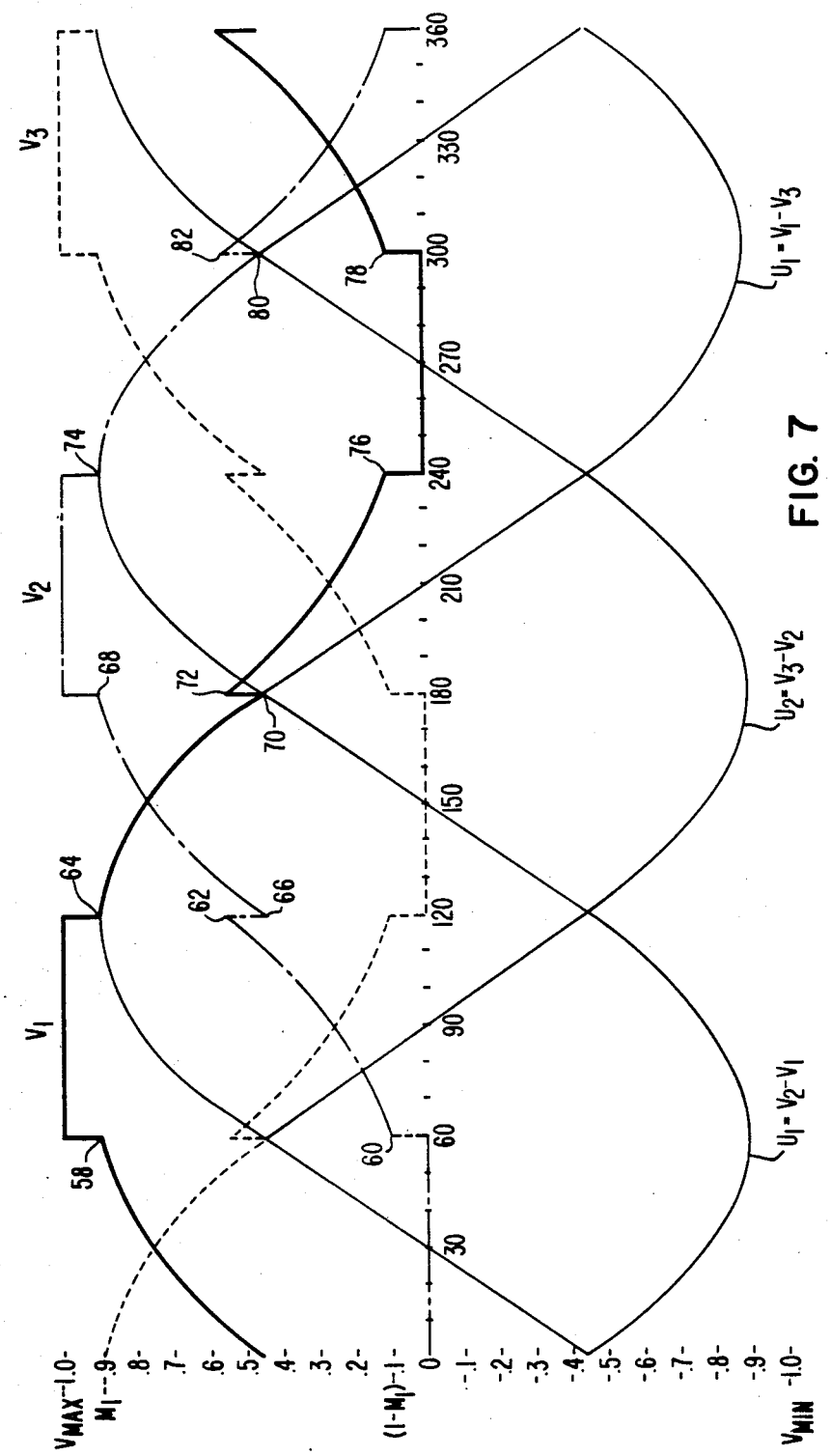
FIG. 7 is a diagram which illustrates pole voltage waveforms constructed according to the teachings of the invention, and the resulting sinusoidal pole-to-pole voltages.

It will be noted in FIG. 7, that while one pole voltage waveform, e.g., $V_1$, is held at the power supply limit $V_{max}$, or at the power supply limit zero, the associated pole voltage $V_2$ required to form pole-to-pole voltage $U_1$, is varied as required in order to provide a sinusoidal waveform for $U_1$.

As shown in FIG. 7, with pole voltage $V_2$ switched to the lower power supply limit for the first 60 electrical degrees, pole voltage $V_1$ is shaped exactly the same as the desired segment of $U_1$ from 0 to 60 degrees, i.e., $U_1$ is equal to $0-V_1$ or $-V_1$.

When the changing pole voltage $V_1$ reaches the upper duty cycle limit $M_1$, it is switched such that it jumps from the regulated waveform at point 58 to the fixed power supply $V_{max}$. Pole voltage $V_2$ simultaneously jumps from the lower fixed power supply limit, i.e., zero, to point 60. The changing portion of $V_2$ from point 60 to point 62 is then tailored such that $V_2$ minus $V_{max}$ forms the desired negative sinusoidal section of $U_1$ from 60 degrees to 120 degrees. When $V_1$ abruptly steps from the upper power supply limit $V_{max}$ back to the regulated zone at point 64 (120 electrical degrees), $V_2$ accommodates the change by stepping downwardly to point 66. The changing values of $V_1$ and $V_2$ are then selected such that the resultant $V_2-V_1$ forms the section of $U_1$ from 120 degrees to 180 degrees. At 180 degrees, waveform $V_2$ reaches the upper duty cycle limit at point 68 and is then switched such that it abruptly jumps to the upper power supply limit $V_{max}$. Waveform $V_1$ simultaneously jumps from point 70 to point 72, and its changing value from 180 to 240 degrees is selected such that $V_{max}-V_1$ produces the desired sine wave segment $U_1$ from 180 to 240 degrees. When $V_2$ abruptly returns from the upper power supply limit $V_{max}$ to the allowable zone at point 74, $V_1$ simultaneously reaches the lower duty cycle limit of the allowable zone at point 76, and then steps downwardly to the lower power supply limit. While $V_1$ is held at zero from 240 to 300 degrees, $V_2$ and $U_1$ coincide, since $U_1=V_2-0$, or $V_2$. When $V_1$ abruptly returns from the lower power supply limit to the allowable zone at point 78, $V_2$ steps upwardly from point 80 to point 82, and $V_2$ departs from the desired sinusoidal waveform $U_1$ such that $V_2-V_1$ forms the desired sinusoidal segment of $U_1$ from 300 to 360 degrees.

It will be noted from FIG. 7 that the positive going alternation of each pole voltage is switched to the upper power supply $V_{max}$ for 60 electrical degrees, centered uniformly in the alternation, and that each negative going alternation of each pole voltage is switched to the lower power supply limit for 60 electrical degrees, also centered uniformly in the alternation. This produces the maximum sinusoidal pole-to-pole voltage, which is 1.8 times the DC source voltage $V_{max}$ when the modulation fraction $M_1$ is 0.9. The available output RMS voltage is 63.6% of the DC source voltage, a 12.5% improvement in the utilization of the DC source, compared with the FIG. 6 arrangement. Thus, when the DC source is a battery system, this translates to a savings of about 12.5% of the battery cost.

While the description to this point has focused on producing the maximum output voltage from the PWM inverter, the modulation technique disclosed allows the generation of any voltage up to the maximum obtainable voltage, without requiring unrealistic switching duty cycles. This will become evident as a practical embodiment of the invention is described in detail. As the pole voltages are reduced from their maximum values, their flat fixed portions will remain at the power supply limits until the desired pole-to-voltage is reduced to about 70% of the fixed source voltage. Below this value, the flat fixed portions of the pole voltage waveform move away from the power supply limits.

Figure 8:
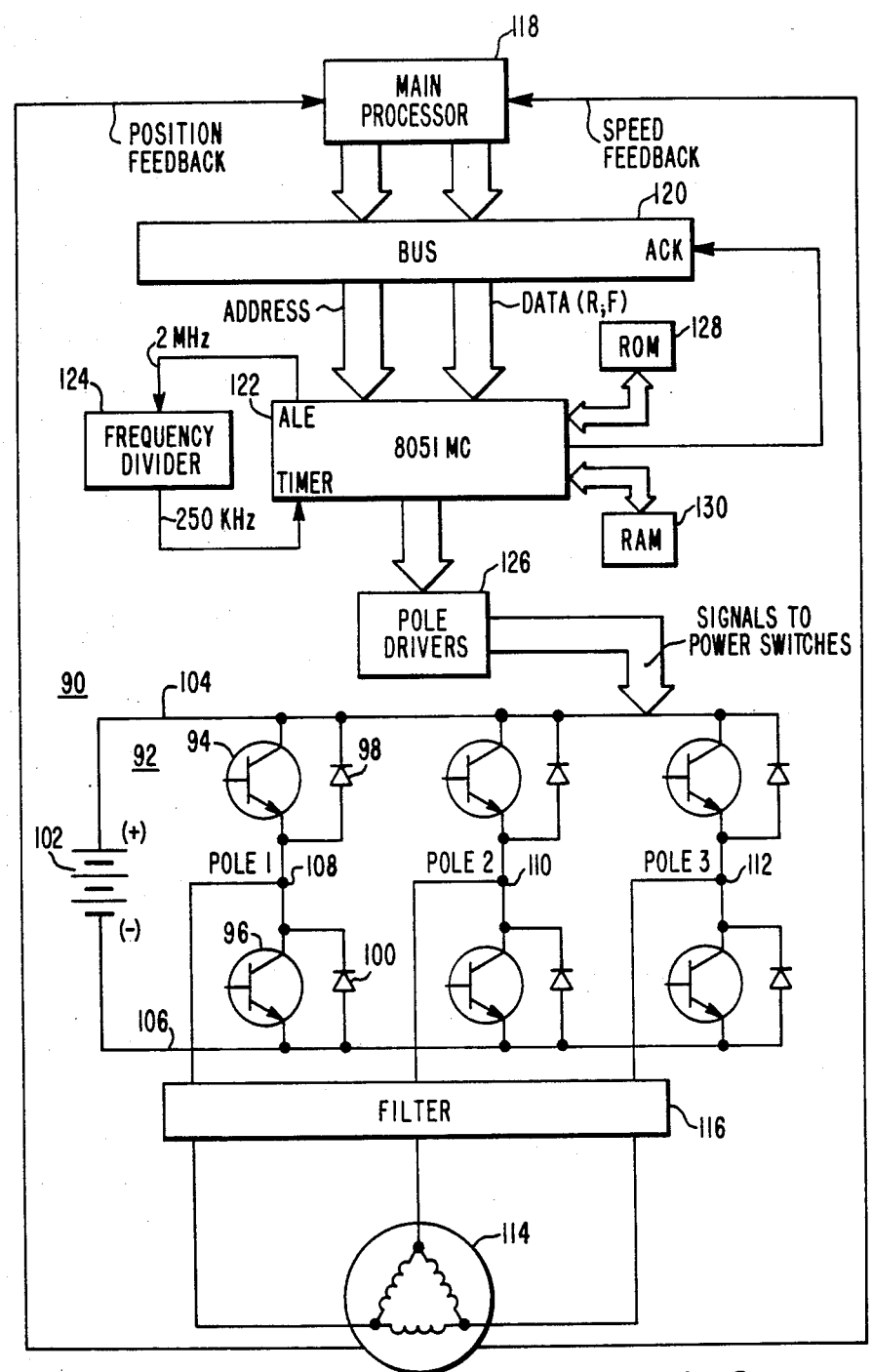
FIG. 8 is a schematic diagram of a computer-based modulator constructed according to a preferred embodiment of the invention.

The preferred embodiment of the invention utilizes a computer-based modulator, with the waveform of one pole, such as waveform $V_1$ shown in FIG. 7, being stored in a look-up table in the computer memory. FIG. 8 is a schematic diagram of a computer-based PWM inverter 90. Inverter 90 includes a three-phase bridge 92 having power switches in each power pole, such as NPN transistors 94 and 96 in pole No. 1. Diodes 98 and 100 shunt transistors 94 and 96, respectively, to carry reverse current. A battery bank 102 is connected to the DC output buses 104 and 106 of bridge 92, and AC output terminals 108, 110 and 112 of the bridge 92 are connected to a three-phase induction motor 114 via a 200 Hz filter 116.

Speed and position feedback signals, such as generated from a pulse wheel, are fed back from the motor 114, or from the load driven by the motor 114, to a main processor 118. The main processor 118 develops an error signal from the desired and actual speed signals, and converts this to a voltage magnitude R and frequency f to be applied to the induction motor. The frequency f can be changed to an angle F, which is calculated from the frequency f and the carrier period $T_9$. The angle F is the angle that pointer A, shown in the look-up tables in FIG. 14, should be advanced. The angle F thus determines the rate at which pointer A traverses the look-up table. Since the look-up table contains instantaneous values of the phase voltages for one cycle, the frequency of the output voltage is proportional to the angle F. The magnitude R is the peak desired output voltage expressed in terms of the maximum voltage $V_{max}$ provided by the DC power supply 102, e.g.

$$R = \frac{V_{peak\ desired}}{V_{max}}$$

The main processor 118 outputs data F to bus 120 along with an address which identifies the data on the bus as the angle F. The main processor 118 then outputs data R to bus 120 along with an address which identifies the data on the bus as the magnitude R. A single chip microcomputer 122, such as Intel's 8051, for example, may be used as the PWM controller. The 2 MHz signal ALE of the computer is connected to a frequency divider 124, such as 4-bit counter, to provide a 250 KHz timing signal for the computer. The microcomputer 122 utilizes the data R and F to prepare signals for pole drivers 126 which control the on and off times of the poles. The pole drivers may be 6 open-collector buffers which provide ±15 mA to control the poles.

Figure 9:
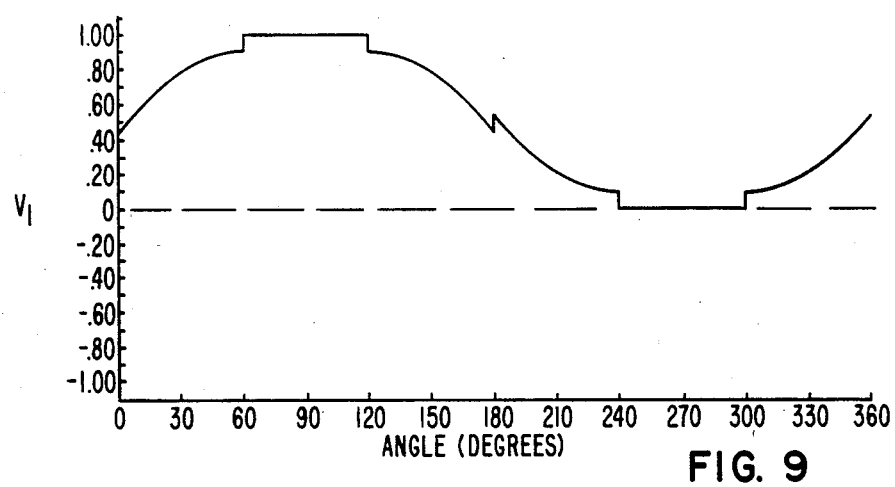
FIG. 9 illustrates the pole voltage waveform which is stored in a look-up table in the read-only memory (ROM) of the computer shown in FIG. 8.

More specifically, the waveform $V_1$ shown in FIGS. 7 and 9 is stored in the microcomputer's read-only memory (ROM) 128, shown off-chip for purposes of example. The computer's random access memory (RAM) 130, is also shown off-chip. The maximum value of $V_1$ is stored for the entire 360 electrical degrees of the waveform. The number of entries in the look-up table may be any desired number, selected to obtain the desired resolution, such as 1020 entries.

Figure 10:
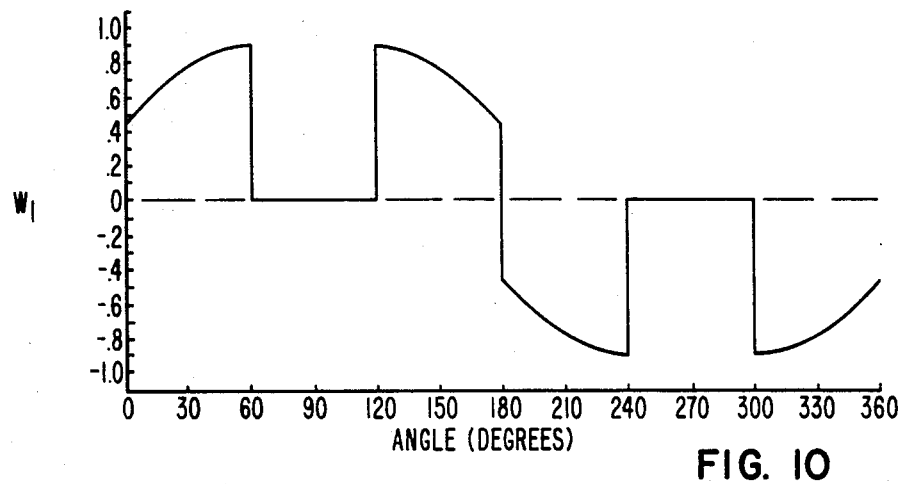
FIGS. 10 and 11 illustrate how the waveform shown in FIG. 9 is broken into two components and stored in two look-up tables, in a preferred embodiment of the invention.
Figure 11:
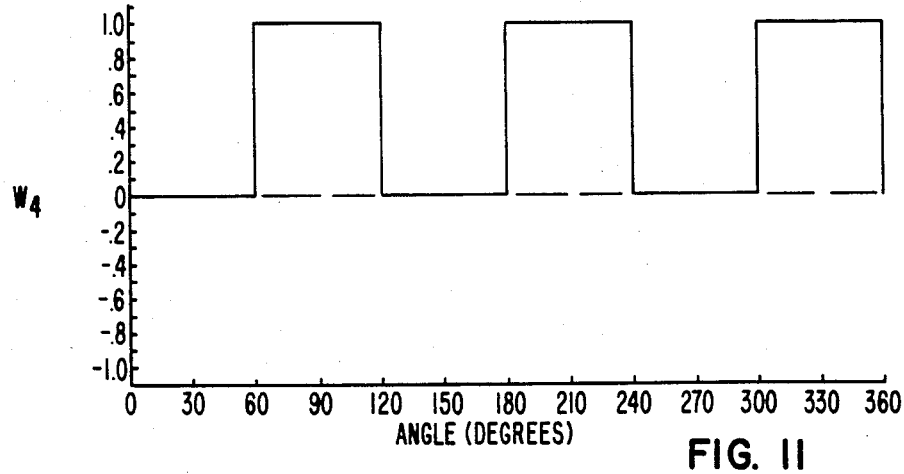
Figure 12:
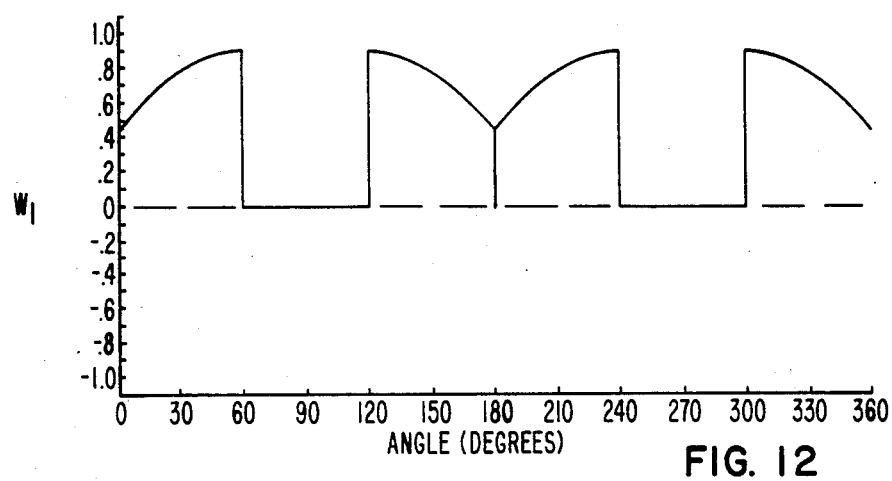
FIGS. 12 and 13 illustrate how the waveforms shown in FIGS. 10 and 11, respectively, may also be arranged for storage in two look-up tables.
Figure 13:
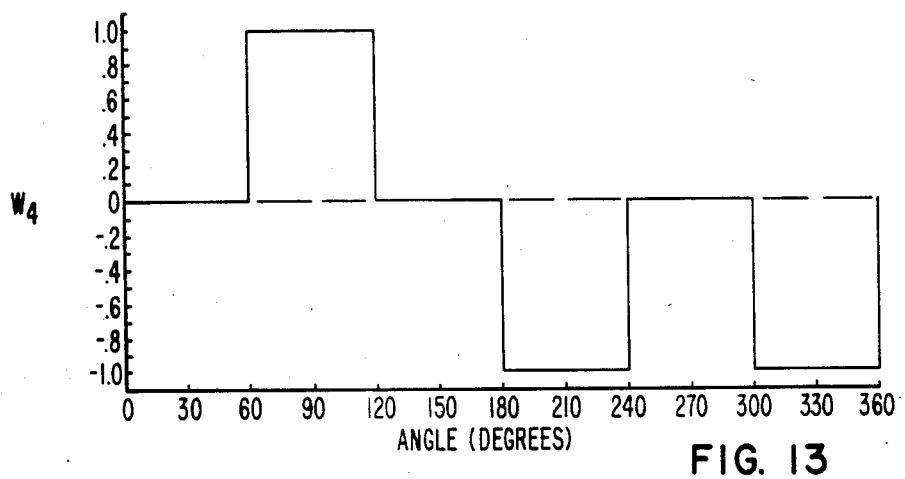

FIG. 9 shows $V_1$ at its maximum value. FIGS. 10 and 11 show components $W_1$ and $W_4$ of $V_1$, which are used to generate all values of $V_1$ from zero to its maximum value. The values of $W_1$ and $W_4$ are stored in look-up tables in ROM. Alternatively, the components $W_1$ and $W_4$ which are stored in ROM may be arranged as shown in FIGS. 12 and 13. The advantage of using the arrangement of FIGS. 12 and 13 is the moving of the sign bit from $W_1$ to $W_4$. Thus, all of the bits of $W_1$ are available for amplitude resolution. $W_4$ absorbs the sign bit without loss of resolution, as it is an "on", "off"

signal, and a whole byte is available. FIG. 14 is a ROM map, with $W_1$ being stored in look-up table No. 1 and $W_4$ being stored in look-up table No. 2.

As shown in FIG. 14, the ROM map of look-up tables No. 1 and No. 2, pointer A is positioned in the look-up table according to the value of the angle F. In other words, each new angle F advances pointer A to obtain a new value of $V_1$. Pointer B is then advanced 120 degrees from the new position of pointer A to obtain waveform $V_2$, and Pointer C is advanced 240 degrees from the new value of Pointer A, to obtain waveform $V_3$. The look-up tables are wraparound, with the pointers returning back to the start of the tables, after advancing past the end of the tables at 360 degrees.

Figure 17:
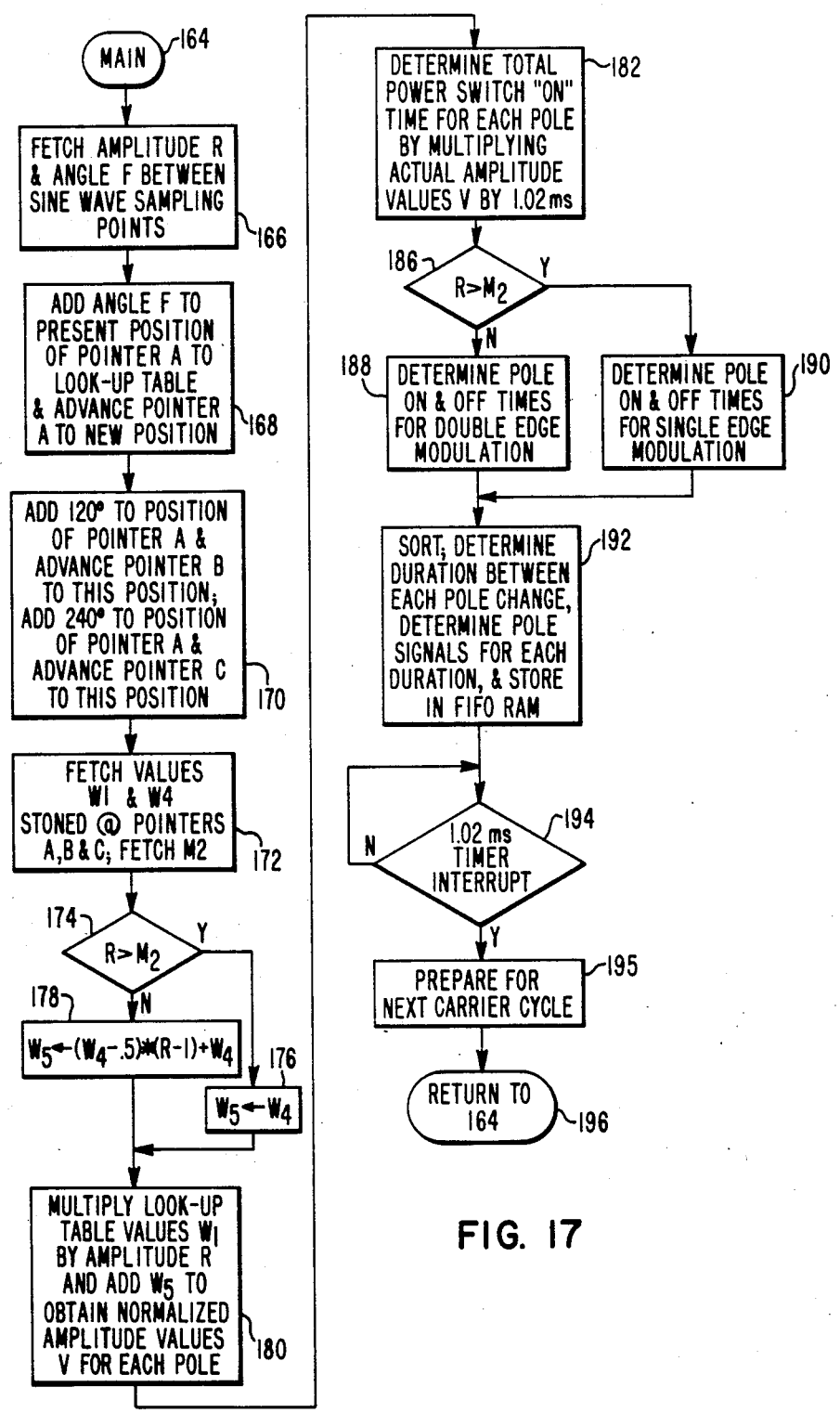
FIG. 17 is a flow chart of a main control program which prepares signals for the power poles.

FIGS. 15, 16 and 17 are flow charts of programs which may be stored in ROM 128 for implementing the invention. FIG. 15 is an initialization program, FIG. 16 is an interrupt driven program, and FIG. 17 is the main control program. The program shown in FIG. 15 is entered at 132 when power is turned on. Step 136 initializes a pointer to a first in, first out (FIFO) stack in the random access memory (RAM) 130, such as pointer 134 to the FIFO stack shown in the RAM map of FIG. 19. The FIFO stack contains the duration times between each change in the power poles, along with the desired status of each power pole during each duration time interval. Step 138 loads a binary count equivalent to decimal one (0000 0001) in a 1.02 ms. software timer, such as shown in the RAM map of FIG. 22. The 1.02 ms. timer will be decremented every 4 $\mu$s, by the output of divider 124 and thus it overflows on count 255 in 1020 microseconds. This establishes the carrier period for the PWM function.

Step 140 zeros a software duration timer, such as the duration timer shown in the RAM map of FIG. 22. The duration timer contains the time interval between the last and the next switching change in the power poles.

Step 142 obtains the modulation fraction $M_1$ from ROM 128, which is a constant for the specific inverter used. As hereinbefore described, the maximum modulation fraction $M_1$ is determined by the on and off times of the power switching devices used in the power poles, with the modulation fraction creating forbidden duty cycle zones adjacent to the power supply limits. In the examples hereinbefore set forth, the maximum modulation fraction $M_1$ has been chosen to be 0.9, but the actual value will depend upon the characteristics of the power switches selected for use in the three-phase bridge 92.

Step 144 multiplies the constant $M_1$ by 2, and subtracts 1 from the product. The result is stored in a location $M_2$ in the RAM map shown in FIG. 22. Thus, if $M_1$ is 0.9, $M_2$ will be 0.8. The purpose for preparing $M_2$ will be hereafter explained. Step 144 proceeds to step 146 which jumps to the start of the main control program shown in FIG. 17.

Microcomputer 122 generates an interrupt every time the duration timer shown in FIG. 22 overflows, which vectors to the starting address 150 of the interrupt program shown in FIG. 16. Step 152 loads the next duration time interval into the duration timer. Step 154 outputs the status of the three poles for the next duration time interval, to the output buffers or pole drivers 126 shown in FIG. 8. Steps 152 and 154 obtain the duration time value and three digit pole status signal from the position of pointer 134 associated with the FIFO stack shown in FIG. 19. Pointer 134 is advanced at step 156 and at 158 the computer returns to the task it was performing when the interrupt occurred.

Step 146 of the initialization program shown in FIG. 15 jumped to the starting address 164 of the main program shown in FIG. 17. Step 166 retrieves the latest values of the amplitude R, and the angle F between the sine wave sampling points, from RAM 130. Step 168 adds the angle F to the present position of pointer A in the look-up table shown in FIG. 14, and Pointer A is advanced to this new position. Step 170 adds 120 degrees to the new position of pointer A, and pointer B is moved to this position. Step 170 also adds 240 degrees to the new position of pointer A, and pointer C is moved to this position. Step 172 obtains the values $W_1$ and $W_4$ from look-up tables 1 and 2, respectively, stored at each of the pointers A, B and C. Step 172 also retrieves the value of $M_2$ computed in step 144 of the program shown in FIG. 15.

The next steps, 174 through 182, are for the look-up table arrangement shown in FIGS. 10 and 11. Step 174 determines if the value of R, the peak voltage desired during the next carrier period, exceeds the value of $M_2$. If it does, step 176 loads the value of $W_4$ into a RAM location $W_5$, as indicated in the RAM map of FIG. 22. If R does not exceed $M_2$, step 174 goes to step 178 which computes a value equal to $(W_4-0.5)*(R-1)+W_4$, and it stores this value at location $W_5$. The purpose of steps 174, 176 and 178 is to prevent the poles from being switched within the forbidden regions from 0 to $(1-M_1)$, and from $M_1$ to 1, as shown in FIG. 7.

Step 180 multiplies the look-up table value of $W_1$ for each pole by the amplitude R and adds $W_5$ to the resulting product. The sum is the actual desired normalized amplitude values $V_1$, $V_2$ and $V_3$ for the power poles (normalized to battery voltage). Step 182 converts these actual desired normalized amplitude values to total switch "on" time for each power pole during the next carrier period, by multiplying each value by the carrier period 1.02 ms. The "on" time for each pole results in its average output voltage over the carrier period being equal to the currently required value of the pole voltage.

The following equations describe the process set forth in the program steps described to this point:

$$M_2 = 2M_1 - 1 \quad (1)$$

$$\text{If } R > M_2, \text{ then } W_5 = W_4 \quad (2)$$

$$\text{If } R < M_2, \text{ then } W_5 = (W_4 - 0.5)*(R - 1) + W_4 \quad (3)$$

$$V_1 = R*W_1 + W_5 \quad (4)$$

$$T_1 = V_1 T_9 \quad (5)$$

In the above equations, $V_1$ is the presently desired voltage for pole No. 1, $T_1$ is the "on" time for pole No. 1, and $T_9$ is the carrier period. The times $T_2$ and $T_3$ for poles 2 and 3, respectively, would be computed in the same way as the time $T_1$ for pole No. 1, using equations (4) and (5). Equation (1) is implemented in step 144 of FIG. 15; equation (2) is implemented at steps 174 abd 176 of FIG. 17; equation (3) is implemented at steps 174 and 178 of FIG. 17; equation (4) is implemented in step 180; and equation (5) is implemented in step 182 of FIG. 17.

When look-up table arrangment shown in FIGS. 12 and 13 is used instead of the arrangement of FIGS. 10 and 11, steps 176 and 178 would be replaced by steps which implement the following logic and equations for determining $W_5$:

If $R \leq M_2$ and $W_4=0$, then:

$$W_5 = (1-R) \div 2 \qquad (6)$$

If $R \leq M_2$ and $W_4 \neq 0$, then:

$$W_5 = (1+R) \div 2 \qquad (7)$$

If $R > M_2$ and $W_4 = 0$, then:

$$W_5 = 0 \qquad (8)$$

If $R > M_2$ and $W_4 \neq 0$, then:

$$W_5 = 1 \qquad (9)$$

Also, when the look-up table arrangement shown in FIGS. 12 and 13 is used, steps 180 and 182 would be replaced by steps which implement the following logic and equations for determining $T_1$:

If $W_4 = -1$, then $$V_1 = W_5 - R*W_1, \qquad (10)$$

and $$T_1 = V_1 T_9 \qquad (11)$$

If $W_4 \geq 0$, then:

$$V_1 = W_5 + R*W_1, \qquad (12)$$

and $$T_1 = V_1 T_9 \qquad (13)$$

Figure 17A:
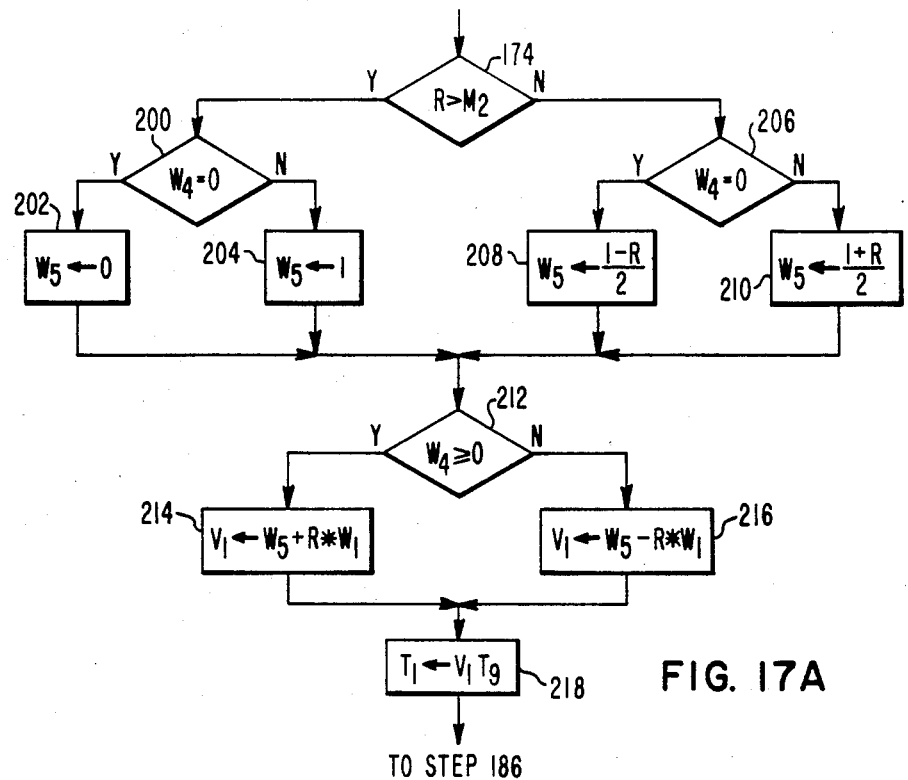
FIG. 17A sets forth a modification of FIG. 17 which is used when the look-up tables of FIGS. 12 and 13 are utilized.

FIG. 17A sets forth the modification of FIG. 17 when the look-up tables of FIGS. 12 and 13 are used. Step 174 goes to step 200 when R exceeds $M_2$ and to step 206 when it doesn't. Step 200 checks to see if $W_4$ is equal to zero. If it is, step 202 sets $W_5$ to zero, and if $W_4$ is not zero, step 200 goes to step 204 where $W_5$ is set to one.

Step 206 checks to see if $W_4$ is equal to zero. If it is, step 208 sets $W_5$ equal to $(1-R) \div 2$, and if $W_4$ is not zero, step 210 sets $W_5$ equal to $(1+R) \div 2$.

Steps 202, 204, 208 and 210 all proceed to step 212 which checks to see if $W_4$ is equal to, or greater than, zero. If it is, $V_1$, the presently desired voltage magnitude, is determined by $W_5 + R*W_1$ in step 214. If $W_4$ is less than zero, i.e., negative, step 216 determines $V_1$ by the relationship $W_5 - R*W_1$. Steps 214 and 216 both proceed to step 218 which determines the "on" time for pole No. 1 for the carrier period being considered by multiplying the desired voltage magnitude $V_1$ by the carrier period $T_9$. Step 218 proceeds to step 186, hereinbefore described.

If only single edge modulation is to be used, such as trailing edge modulation, step 182 would advance directly to step 190. If double edge modulation is to be used where possible, i.e., where a pole switching time would not fall within the forbidden zones of a carrier period, and with single edge modulation to be used when double edge modulation is not possible, step 182 proceeds to step 186 to test if R exceeds $M_2$. If R exceeds $M_2$, then step 186 proceeds to step 190. If step 186 finds that R does not exceed $M_2$, then double edge modulation may be used, and step 186 advances to step 188.

Figure 18:
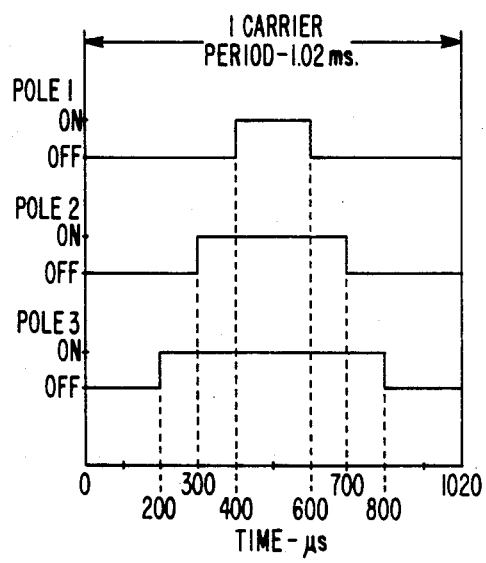
FIG. 18 illustrates double-edge modulation.
Figure 20:
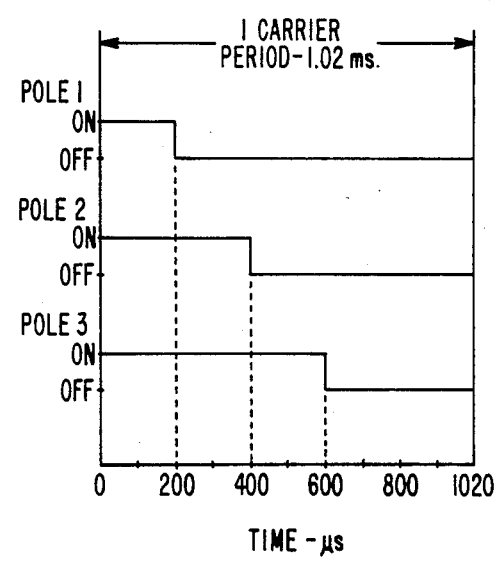
FIG. 20 illustrates single (trailing) edge modulation.

Step 188 determines the pole on and off times for double edged modulation, which centers the "on" time within the carrier period. FIG. 18 sets forth an example of double edge modulation. If single edge modulation must be used, step 190 determines the on and off times for single edge modulation. FIG. 20 sets forth an example of single (trailing) edge modulation, wherein, if the pole is to be turned on at all during the carrier period, it is always turned on at the start of the carrier period.

Steps 188 and 190 both proceed to step 192, which determines the duration between each pole switching change, and it develops a three digit pole signal for each duration interval. The duration time values and the three digit pole signal are stored in the FIFO stack of RAM 130, set forth in FIG. 19.

Using the example of double edge modulation shown in FIG. 18, the first pole change occurs at 200 $\mu$s, and this value is loaded into the top of the FIFO stack shown in FIG. 19. During the time 0 to 200 $\mu$s, all poles are off, and thus the three digit pole signal is 000, which signal is also stored in the FIFO stack shown in FIG. 19. The next pole change occurs at 300 $\mu$s, which is an interval of 100 $\mu$s since the last pole change. The value 100 $\mu$s is loaded into the next position in the FIFO stack. During the interval 200 to 300 $\mu$s, poles 1 and 2 are off and pole 3 is on. Thus, the three digit pole signal is 001. This process continues until the complete carrier period has been covered. While the values in one FIFO stack one utilized, the values for the next carrier period are being computed and stored in a similar FIFO stack, as indicated in FIG. 19.

Using the example of single edge modulation shown in FIG. 20, the first pole change occurs at 200 $\mu$s, and this value is loaded into the top of the FIFO stack shown in FIG. 21. All poles are on during this interval, and thus the three digit pole signal is 111. The next pole change occurs at 400 $\mu$s, which is 200 $\mu$s since the last pole change. Thus, 200 $\mu$s is loaded into the next stack position. During this interval, pole 1 is off and poles 2 and 3 are on. Thus, the three digit pole signal is 011. This process continues until the complete information for the next carrier period has been processed.

After step 192 has been completed, there is nothing further to do until the next carrier period starts, so a waiting loop is entered at 194. Of course, a duration timer interrupt will vector the program to the address 150 of the duration timer interrupt program shown in FIG. 16.

When a 1.02 ms timer interrupt occurs to signal the start of the next carrier period, step 194 advances to step 195 which does the necessary housekeeping to prepare for the next carrier cycle. Step 195 then returns to the start 164 of the main program at step 196.

In summary, there has been disclosed a new and improved PWM inverter system which increases the utilization of the DC power source by 12%, compared with prior art techniques.

We claim as our invention:
1. A PWM inverter having a predetermined maximum modulation fraction, comprising:
   a three-phase bridge circuit having three power poles,
   DC input terminals on said three-phase bridge circuit connectable to a unidirectional power supply having predetermined fixed upper and lower voltage limits,

AC output terminals on said three-phase bridge circuit connectable to a load circuit, and
control means for controlling the conduction times of the power poles to provide substantially sinusoidal pole voltages which alternate between the upper and lower voltage limits of the power supply, without entering a predetermined zone adjacent each limit,
said control means including means for switching each half cycle of each pole voltage to a predetermined fixed voltage limit of the power supply for a predetermined number of electrical degrees, resulting in step changes from a substantially sinusoidal changing waveform to the associated fixed limit voltage, to increase the maximum RMS pole-to-pole voltages obtainable from the unidirectional power supply,
said control means including a memory, with the desired maximum waveform of a pole voltage being stored in said memory,
said memory including first and second look-up tables, with the value of the changing portion of the pole voltage waveform being stored in the first look-up table, and with the value of the fixed portion of the pole voltage waveform being stored in the second look-up table.

2. In the PWM inverter of claim 1, wherein the control means modifies the magnitude of a predetermined changing pole voltage while each pole voltage is at the predetermined fixed limit of the power supply, to provide sinusoidal pole-to-pole voltages.

3. In the PWM inverter of claim 1 wherein the predetermined number of electrical degrees is 60°, symmetrically centered in each half cycle of each pole voltage.

4. In the PWM inverter of claim 1 wherein the pole voltage waveforms, in addition to being switched to a power supply limit for the predetermined number of electrical degrees during each half cycle, are modified such that when a fixed portion of one pole voltage is vectorially combined with a predetermined changing pole voltage, the result is a sinusoidal pole-to-pole voltage.

5. In the PWM inverter of claim 1, including means for modifying the first look-up table value in response to a predetermined relationship between the modulation fraction of the inverter and the desired output voltage from the inverter at any instant.

6. A method of increasing the maximum three-phase output voltage of a PWM inverter operating from a DC power supply having fixed upper and lower voltage limits, comprising the steps of:
storing a desired pole voltage waveform having fixed and changing portions in a memory,
said storing step including the steps of storing the changing portions of the desired pole voltage waveform in a first look-up table, and storing the fixed portions of the desired pole voltage waveform in a second look-up table,
obtaining values of said desired pole voltage waveform from memory,
and generating substantially sinusoidal pole voltages responsive to said obtained values, with said generated pole voltages having no values within predetermined zones adjacent to each limit of the power supply.

7. The method of claim 6 wherein the generating step maintains each pole voltage at the fixed power supply limit for sixty electrical degrees during each half cycle.

8. The method of claim 6 wherein the generating step respectively maintains each pole voltage at the fixed upper and lower limits of the power supply during the positive and negative going half cycles.

9. The method of claim 6 wherein the step of storing a desired maximum pole voltage waveform in a memory includes the steps of storing values in first and second look-up tables, with the first look-up table including values $W_1$ representative of the changing portions of the waveform, and with the second look-up table including values $W_4$ representative of the fixed portions of the waveform.

10. The method of claim 9 wherein $W_1$ includes both positive and negative values, and the values of $W_4$ are all of like polarity.

11. The method of claim 10 including the steps
setting a variable $M_2$ equal to $2M_1 - 1$;
setting a variable $W_5$ equal to $W_4$ when R exceeds $M_2$;
setting the variable $W_5$ equal to $(W_4 - 0.5)(R - 1) + W_4$ when R does not exceed $M_2$;
and determining the actual required voltage amplitude $V_1$ for a pole voltage according to the relationship $W_1 R + W_5$.

12. The method of claim 11 including the steps of:
dividing the desired pole voltage waveform into a number of carrier periods each having the duration $T_9$, and determining the pole "on" time $T_1$ according to the relationship $V_1 T_9$.

13. The method of claim 9 wherein the values of $W_1$ are all of like polarity, and $W_4$ includes both positive and negative values.

14. The method of claim 13 including the steps of:
setting a variable $M_2$ equal to $2M_{1-1}$;
determining if R exceeds $M_2$;
determining if $W_4$ is equal to zero;
setting a variable $W_5$ to zero when R exceeds $M_2$ and $W_4$ equals zero;
setting the variable $W_5$ to one when R exceeds $M_2$ and $W_4$ is not zero;
setting the variable $W_5$ to $(1-R)/2$ when R does not exceed $M_2$ and $W_4$ is zero;
setting the variable $W_5$ to $(1+R)/2$ when R does not exceed $M_2$ and $W_4$ is not zero;
determining if $W_4$ is negative;
determining the actual required amplitude $V_1$ for a pole voltage according to the relationship $W_5 - RW_1$ when $W_4$ is negative;
and determining the actual required amplitude $V_1$ according to the relationship $W_5 + RW_1$ when $W_4$ is not negative.

15. The method of claim 14 including the steps of:
constructing the desired pole voltage waveform from carrier periods each having the time duration $T_9$;
and determining the pole "on" time according to the relationship $V_1 T_9$.

16. A method of increasing the maximum three-phase output voltage of a PWM inverter operating from a DC power supply having fixed upper and lower voltage limits, comprising the steps of:
storing a desired pole voltage waveform having fixed and changing portions in a memory,
providing the maximum modulation fraction $M_1$ for the inverter,
providing the fraction R of the maximum supply voltage presently desired,
obtaining values of said desired pole voltage waveform from memory, and generating substantially sinusoidal pole voltages responsive to said obtained values, said generating step including the step of modifying a value obtained from the memory in response to a predetermined relationship between $M_1$ and R, to prevent the selection of predetermined duty cycles.

17. The method of claim 16 wherein the predetermined relationship is R relative to a value which is equal to twice the modulation fraction $M_1$, minus 1.

* * * * *